United States Patent [19]
Riggio

[11] Patent Number: 5,329,223
[45] Date of Patent: Jul. 12, 1994

[54] IDEAL VOLTAGE CONTROLLER FOR CONSERVING ENERGY IN INDUCTIVE LOADS

[75] Inventor: Chris A. Riggio, Boulder, Colo.

[73] Assignee: Green Technologies, Inc., Boulder, Colo.

[21] Appl. No.: 905,288

[22] Filed: Jun. 26, 1992

[51] Int. Cl.$^5$ ............................................. G05F 1/455
[52] U.S. Cl. .................................. 323/246; 323/237; 323/300; 323/320
[58] Field of Search ............... 323/237, 239, 246, 300, 323/320, 324

[56] References Cited

U.S. PATENT DOCUMENTS

| | | | |
|---|---|---|---|
| 3,441,823 | 4/1969 | Schlabach | 318/221 |
| 3,506,852 | 4/1970 | DeHart | 307/252 |
| 3,633,094 | 1/1972 | Clements | 323/18 |
| 3,821,634 | 6/1974 | Sabolic | 323/24 |
| 3,859,591 | 1/1975 | Saunders | 323/18 |
| 3,961,236 | 6/1976 | Rodek et al. | 323/18 |
| 3,997,825 | 12/1976 | Miyasita et al. | 318/171 |
| 4,011,489 | 3/1977 | Franz et al. | 318/227 |
| 4,052,648 | 10/1977 | Nola | 318/200 |
| 4,078,393 | 3/1978 | Wills | 62/184 |
| 4,158,164 | 6/1979 | Nutz | 323/24 |
| 4,176,307 | 11/1979 | Parker | 318/798 |
| 4,185,575 | 1/1980 | Brown et al. | 112/277 |
| 4,190,793 | 2/1980 | Parker et al. | 318/800 |
| 4,194,145 | 3/1980 | Ritter | 318/799 |
| 4,237,531 | 12/1980 | Cutler et al. | 363/58 |
| 4,242,625 | 12/1980 | Hedges | 318/729 |
| 4,255,695 | 3/1981 | Plunkett et al. | 318/723 |

(List continued on next page.)

FOREIGN PATENT DOCUMENTS

| | | | |
|---|---|---|---|
| 57-68694 | 4/1982 | Japan | H02P 7/62 |
| 58-144597 | 8/1983 | Japan | H02P 7/62 |
| 61-142981 | 6/1986 | Japan | H02P 1/42 |
| 62-285691 | 12/1987 | Japan | H02P 7/622 |
| 2079500A | 1/1980 | United Kingdom | G05F 1/70 |
| 2073921A | 10/1981 | United Kingdom | G05F 1/66 |

OTHER PUBLICATIONS

Frank J. Nola, "Save Power in AC Induction Motors," *Nasa Technical Briefs*, Sep., 1977, pp. 179, 180.

(List continued on next page.)

*Primary Examiner*—Jeffrey L. Sterrett
*Attorney, Agent, or Firm*—McCubbrey, Bartels & Ward

[57] ABSTRACT

An apparatus and method for controlling the voltage applied to a load is taught. The method includes receiving an AC line voltage, generating an operating AC voltage from the AC line voltage and applying this operating AC voltage across the load. A measured signal which is a function of the magnitude of the operating AC voltage is generated, and then averaged to generate an average signal representative of the average value of the measured signal. The operating AC voltage is continually readjusted in response to changes in the average signal. The apparatus implementing this method includes terminal means for receiving an AC line voltage, means for generating an operating AC voltage from the AC line voltage, connector means for applying the operating AC voltage across the load, and voltage detection means for generating a measured signal which is a function of the magnitude of said operating AC voltage. Signal averaging means are provided for generating an average signal representative of the average value of the measured signal. Finally, the apparatus includes AC voltage modulation means for adjusting the operating AC voltage in response to the average signal. In the preferred embodiment of the apparatus of the present invention, the AC voltage modulation means comprises voltage reduction means for switching off the line voltage for a portion of each cycle, the length of the portion being determined by the average value of the measured signal. The voltage modulation means may comprise a phase control integrated circuit device for controlling a triac. The phase control integrated circuit device is responsive to the average signal to generate a control signal operative to control a triac to switch off transmission of the line voltage to the load for the portion of each cycle.

17 Claims, 6 Drawing Sheets

U.S. PATENT DOCUMENTS

| | | | |
|---|---|---|---|
| 4,266,177 | 5/1981 | Nola | 318/810 |
| 4,271,386 | 6/1981 | Lee | 318/729 |
| 4,287,464 | 9/1981 | Lee et al. | 318/805 |
| 4,298,831 | 11/1981 | Espelage et al. | 318/112 |
| 4,302,717 | 11/1981 | Olla | 323/324 |
| 4,323,835 | 4/1982 | Lee | 318/729 |
| 4,333,046 | 6/1982 | Lee | 323/231 |
| 4,379,258 | 4/1983 | Sugimoto | 318/805 |
| 4,380,730 | 4/1983 | Morton, Jr. | 323/300 |
| 4,404,511 | 9/1983 | Nola | 318/729 |
| 4,417,190 | 11/1983 | Nola | 318/729 |
| 4,426,614 | 1/1984 | Nola | 323/243 |
| 4,433,276 | 2/1984 | Nola | 318/729 |
| 4,439,718 | 3/1984 | Nola | 318/729 |
| 4,459,528 | 7/1984 | Nola | 318/719 |
| 4,469,998 | 9/1984 | Nola | 318/729 |
| 4,567,425 | 1/1986 | Bloomer | 323/237 |
| 4,689,548 | 8/1987 | Mechlenburg | 323/243 |
| 4,766,363 | 8/1988 | Rutter et al. | 323/239 |
| 4,870,340 | 9/1989 | Kral | 323/239 |
| 5,239,255 | 8/1993 | Schanin et al. | 323/300 |

OTHER PUBLICATIONS

Frank J. Nola, "Fast-Response Power Saver for Induction Motors," *NASA Tech Briefs*, Jun. 1979, pp. 6, 7.

Joseph A. Cusack, "VHF Frequency Multiplier," *NASA Tech Briefs*, Jun. 1979, p. 7.

Frank J. Nola, "Improved Power-Factor Controller," *NASA Tech Briefs*, Sep. 1980, pp. 133, 134.

Frank J. Nola, "Energy Saving in ac Generators," *NASA Tech Briefs*, Sep. 1980, p. 134.

NASA Technology Utilization Office, Technical Support Package, "Power Factor Controller, Brief No. MFS-23280," Apr. 2, 1979, pp. Cover—20.

NASA Technology Utilization Office, Technical Support Package, "Fast-Response Power Saver for Induction Motors," NASA Tech Briefs, Jun. 1979, vol. 4, No. 1, MFS-23988, pp. Cover—9.

NASA Technology Utilization Office, Technical Support Package, "Improved Power-Factor Controller," NASA Tech Briefs, Sep. 1980, vol. 5, No. 2, MFS-25323, pp. Cover—11.

IDEAL VOLTAGE CONTROLLER FOR CONSERVING ENERGY IN INDUCTIVE LOADS

FIELD OF THE INVENTION

The present invention relates generally to the field of controlling voltage applied to a load, and more particularly to an apparatus for conserving energy in operating inductive and resistive loads.

BACKGROUND OF THE INVENTION

Energy conservation has become a major concern in the design of electrical circuits and systems. Energy conservation has benefits to the end users and society as a whole. For example, on the one hand, diminished use of energy lowers operating costs of the system. On the other hand, diminished need for energy results in diminished adverse environmental impact such as pollution, depletion of resources and the like. One example of the need for reduction in energy consumption lies with the operation of AC motors. The use of such AC motors has become commonplace. Many ordinary appliances and much of the equipment used in residential as well as in industrial and commercial settings utilize such motors. These motors are ordinarily connected to power lines provided by local utility companies, which can vary substantially in voltage between locales and over time. Motors typically operate at relatively constant speeds, the speed being independent of the applied AC voltage to the motor over a range of operating voltages.

The energy consumption of any load element in an electric circuit, such as a motor, is determined from the integral over a predetermined period of the product of the instantaneous AC voltage applied across the load terminals and the instantaneous AC current through the load. Typical AC line voltages are sinusoidal. It is known that applying a sinusoidal input to an inductive load will result in both the AC voltage and AC current having the same sine wave shape but with an offset in time. The time offset between voltage and current is called a phase shift or phase difference and is typically expressed as an angle. For a constant voltage and, hence, relatively constant current, the power consumed by a load may be expressed as $VI\cos\Phi$, where V is the average value of the applied AC voltage across the load, I is the average value of the AC current through the load and $\Phi$ is the phase difference between the voltage and the current. Cos $\Phi$ is sometimes referred to as the "power factor". Thus, power consumption is related to the phase difference between the AC voltage applied to the load and the AC current through the load. This phase difference is dependent upon the load condition of the motor. Hence power consumption is dependent upon the load status of the motor and upon the line voltage applied to the motor.

Most motors are designed to operate adequately at predetermined line voltages. Normally, the motor designer must assume that the motor will be operated at the lowest line voltage normally encountered. Such a voltage may be far lower that the normal line voltage available at most locations and at most times. For example, a load used in a refrigerator must be capable of delivering adequate power under full load during a "brown-out" condition, i.e., when a utility reduces line voltage over its entire grid (or portion thereof) in response to unusually high electrical energy demand. Changes in line voltage effects both load performance and energy consumption. While wide variations in line voltage are, thus, undesirable, such variations are beyond the control of most load designers and users. It is noted that ordinary line voltage fluctuations will not result in changes in the phase between the current and the voltage. Prior art energy conserving systems are responsive to changes in phase but not to fluctuations in line voltage.

Therefore, there is a need for a energy savings system for controlling the voltage applied to a load which is simple and which is responsive to changes in line voltage to adjust for such changes.

Accordingly, it is an object of the present invention to provide an improved load control system for energy savings.

Another object of the invention is to provide an energy savings system for use with various loads which are simpler in design than the prior art.

These and other objects of the invention will become apparent to those skilled in the art from the following description and accompanying claims and drawings.

SUMMARY OF THE INVENTION

The present invention comprises an apparatus and method for controlling the voltage applied to a load. The method includes receiving an AC line voltage. An operating AC voltage is generated from the AC line voltage and this operating AC voltage is applied across the load. A measured signal which is a function of the magnitude of the operating AC voltage is generated. The measured signal is then averaged to generate an average signal representative of the average value of the measured signal. The operating AC voltage is continually readjusted in response to changes in the average signal.

An apparatus implementing the method of the present invention is also taught. The apparatus includes terminal means for receiving an AC line voltage, means for generating an operating AC voltage from the AC line voltage, connector means for applying the operating AC voltage across the load, and voltage detection means for generating a measured signal which is a function of the magnitude of said operating AC voltage. Signal averaging means are provided for generating an average signal representative of the average value of the measured signal. Finally, the apparatus includes AC voltage modulation means for adjusting the operating AC voltage in response to the average signal.

In the preferred embodiment of the apparatus of the present invention, the AC voltage modulation means comprises voltage reduction means for switching off the line voltage for a portion of each cycle, the length of the portion being determined by the average value of the measured signal. The voltage modulation means may comprise a phase control integrated circuit device for controlling a triac. The phase control integrated circuit device is responsive to the average signal to generate a control signal operative to control a triac to switch off the line voltage to the load for the portion of each cycle.

DETAILED DESCRIPTION OF THE INVENTION

While it is known that adjusting the voltage applied to a load may be used to save energy, in order to be practical for most applications, voltage adjustment means must be able to quickly respond to changes in the line voltage. Available technologies for sensing such changes have not proved practical for widespread application. In this regard, there is a need for a relatively simple, inexpensive, "foolproof" yet reliable energy saving device. The present invention employs novel means for sensing changes in the AC line voltage thereby allowing adjustment of the voltage to variations in the AC line voltage to save energy.

Figure 1:
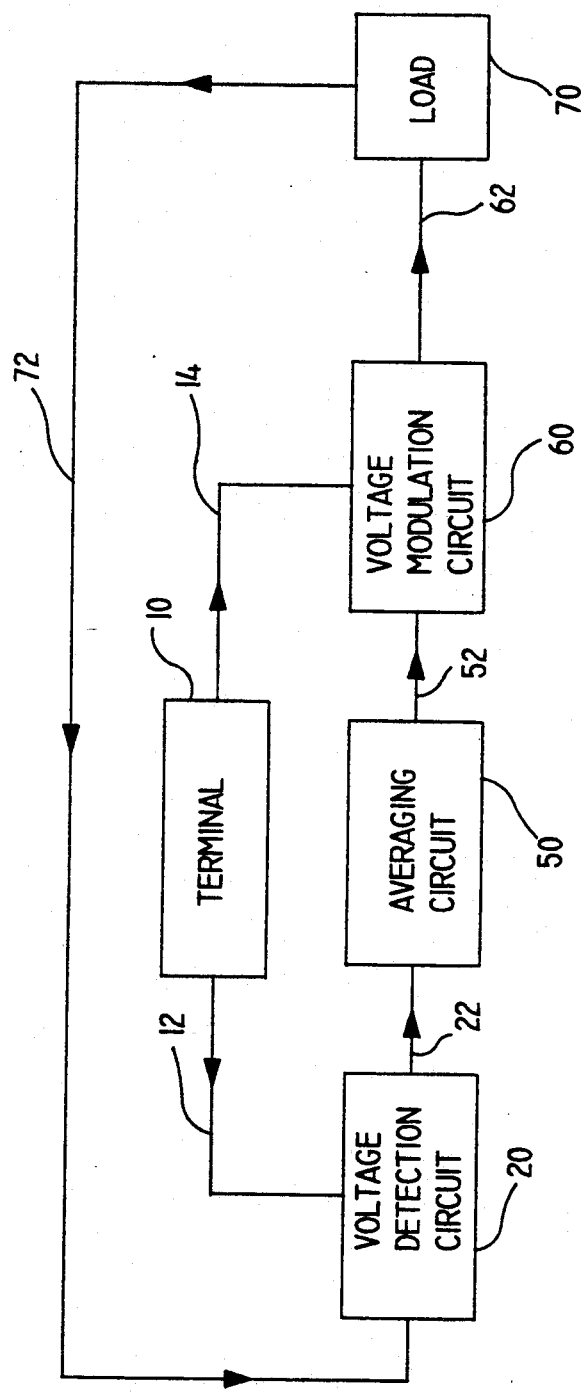
FIG. 1 is a block diagram showing the major functional components comprising the present invention.

A voltage controller circuit according to the present invention contains the subcircuits illustrated in block diagram form in FIG. 1. The overall circuit comprises a feedback loop. In this loop the operating AC voltage across a load 70 is detected by voltage detection circuit 20, which generates a measured voltage signal representative of the instantaneous magnitude of the voltage applied to the load. The measured voltage signal is time averaged in averaging circuit 50 to generate an voltage signal representing the value of the measured signal over at least one complete cycle. This average signal controls a voltage modulation circuit 60, which interrupts application of the AC line voltage to load 70, thus controlling the average magnitude of the operating AC voltage applied to load 70. Voltage feedback to voltage modulation circuit 60 responds to changes in the operating and line voltages.

More specifically, a terminal 10 is provided for directly receiving an AC line voltage from an AC power supply system (not shown), for example, an ordinary AC outlet. Voltage modulation circuit 60 receives the AC line voltage from terminal 10 via AC voltage connector 14. Voltage modulation circuit 60 modulates the AC line voltage to generate the operating AC voltage applied to the load. The AC line voltage is modulated so that the power transmitted to load 70 via modulated AC voltage connector 62 varies in response to a control signal received by voltage modulation circuit 60 from average signal connector 52. The method by which the "average" signal is generated is discussed in detail below. It is important to note that the circuit according to the present invention is utilized in connection with a load 70 which is part of a separate device apart from the voltage controller. It is included in the Figures and discussion herein to clarify the relationship between the voltage controller circuit and load 70 to be controlled.

The measured signal is generated from the voltage applied across load 70 by transmitting the operating AC voltage across applied AC voltage connector 72 to voltage detection circuit 20. Voltage detection circuit 20 generates the measured signal, which is a function of the magnitude of the operating AC voltage. In the preferred embodiment of the present invention, this representation is a difference signal between the AC line voltage and the operating AC voltage. Hence a difference signal between the AC line voltage received over AC line voltage connector 12 and the operating voltage received over operating AC voltage connector 72 is generated and rectified. Those skilled in the art will recognize that a variety of alternative output signals may be generated which are also functions of the operating AC voltage.

The measured signal is then transmitted via measured signal connector 22 to averaging circuit 50. Averaging circuit 50 averages the instantaneous value of the measured signal over at least one cycle, to generate a voltage representative of the time average of that AC voltage.

The preferred embodiment includes an integrator circuit located within averaging circuit 50 to obtain the average signal from the measured signal. The average signal thus generated is a signal representative of the rms value of the measured signal, which is related to the magnitudes of the voltage across the load.

Figure 2:
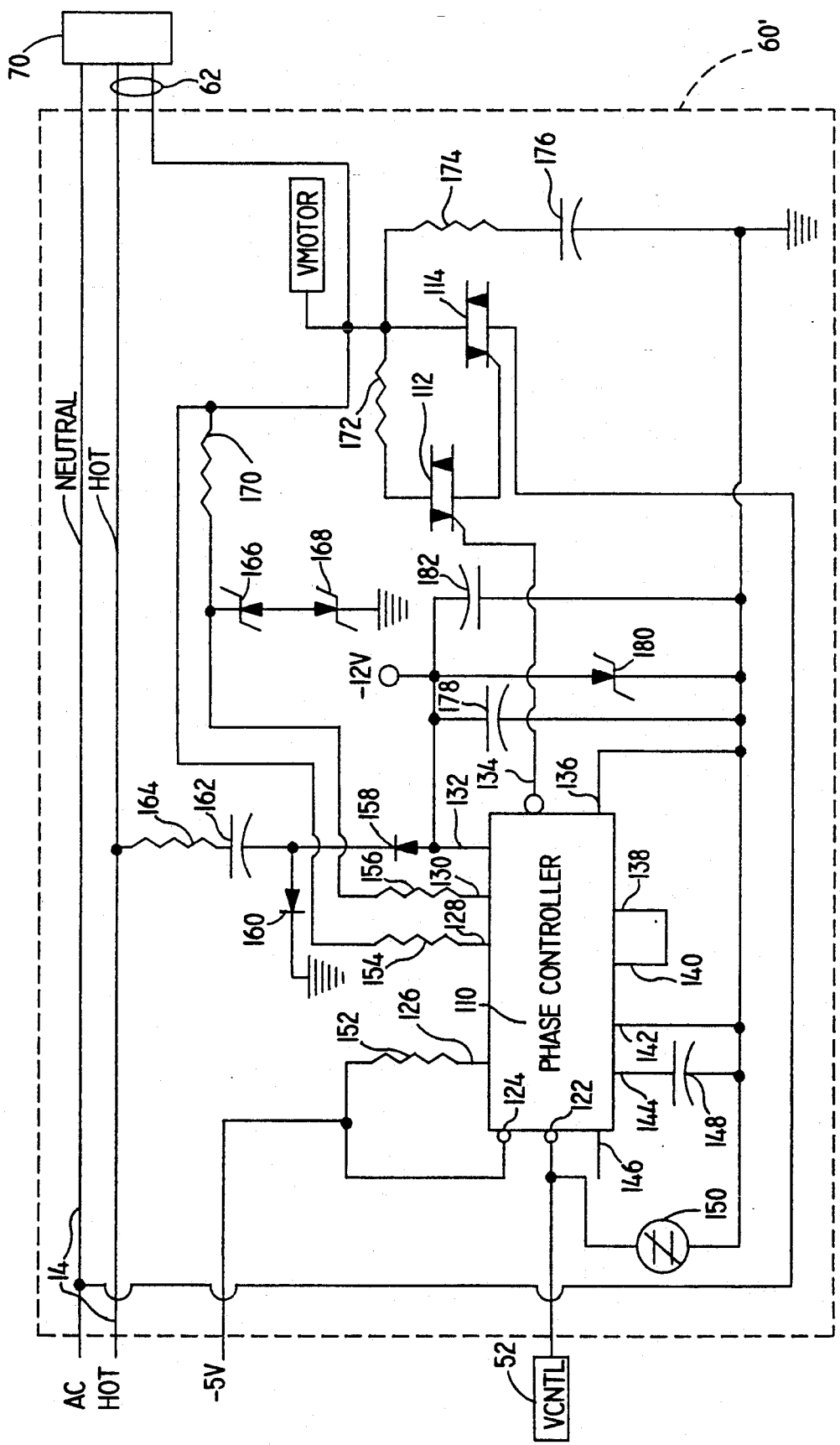
FIG. 2 illustrates an AC voltage modulation means 60 of FIG. 1.

One preferred embodiment of an AC voltage modulation circuit 60 of FIG. 1 according to the present invention is illustrated at 60' in FIG. 2. Elements illustrated in FIG. 1 present in FIGS. 2-5 are labelled consistently throughout. In this subcircuit a phase control chip 110 responds to the signal from average signal connector 52 to control pilot triac 112 and thereby main triac 114. Main triac 114 acts to interrupt application of the AC line voltage to load 70 and thereby generate the operating AC voltage.

The AC line voltage is received at AC voltage modulation circuit 60 via unmodulated AC voltage connector lines 14, including an AC line voltage line ("AC hot") and an AC neutral line.

Modulation of AC operating voltage of the preferred embodiment of the present invention is accomplished using pilot triac 112 and main triac 114. A triac is a well known device whereby small current signals applied to its gate can control much larger current flows at much higher voltages. A triac is triggered into conduction by pulses at its gate. In the present circuit a signal applied at the gate of pilot triac 112 from phase control chip 110 permits a current to flow through triac pilot 112, which is applied to the gate of main triac 114. While it might be possible for a single stage triac to be utilized, a two stage triac arrangement may allow for control of the relatively large current to a high power load by a phase control chip which has only a limited capacity to deliver a gate control current. Therefore this staged triac arrangement permits the output of phase control chip 110 to control the applied AC voltage to load 70 over modulated AC voltage connector 62.

The voltage applied to the load is controlled by the control signal pulses received at the gate of pilot triac 112 from phase control chip 110. In one embodiment of the present invention, a TDA 2088 phase controller chip from Plessey Semiconductors is utilized as phase control chip 110. The TDA 2088 chip is designed for use with triacs for use in current feedback applications, and is frequently used for speed control of small universal motors.

Phase control chip 110 requires an applied voltage at voltage input pin 132 of $-12$ V and a 0 V reference voltage at 0 V reference pin 142. These voltages are used to power the chip and to generate a $-5$ V reference voltage at $-5$ V reference pin 124. This voltage is obtained from the AC line voltage by a power supply subcircuit, which operates as follows. Resistor 164 and capacitor 162 are connected in series to the AC line voltage on AC line hot line 14 to provide a filtered voltage to diodes 160 and 158, which permit only the negative half cycle of the AC line voltage to pass. Capacitor 178 is provided to smooth the resulting voltage at voltage input pin 132, and zener diode 180 latches the voltage at that pin to a value of −12 V.

Phase control chip 110 supplies control signal pulses at triac gate output pin 134. Phase control chip 110 has an internal ramp generator whose value is compared to the voltage applied at program input pin 122. When these two values are equal an output pulse is triggered. The ramp generator has two input connections. First, pulse timing resistor input pin 126 is connected to a −5 V reference by pulse timing resistor 152. Secondly, pulse timing capacitor input pin 144 is connected to ground by pulse timing capacitor 148. The values of pulse timing resistor 152 and pulse timing capacitor 148 are chosen to define to slope of the ramp signal.

In addition to the support circuitry for phase control chip 110 described above, AC voltage modulation circuit 60 is provided with a thermal switch 150. Thermal switch 150 is connected between ground and average signal connector 52, which applies the average signal from averaging circuit 50 to program input pin 122 of phase control chip 110. Thermal switch 150 acts to ground out program input pin 122 if the system overheats. This is a safety feature which acts to shut off the load in the event of circuit overheating.

Also, resistor 174 and capacitor 176 are provided to act as a "snubber" network, which enhances the ability of main triac 114 to operate with inductive loads. In the absence of such a snubber network, false firings of the triac might occur with rapidly varying applied voltages. The snubber network acts to delay the voltage rise to main triac 114 to ensure smooth and correct changes in triac conduction.

Figure 3:
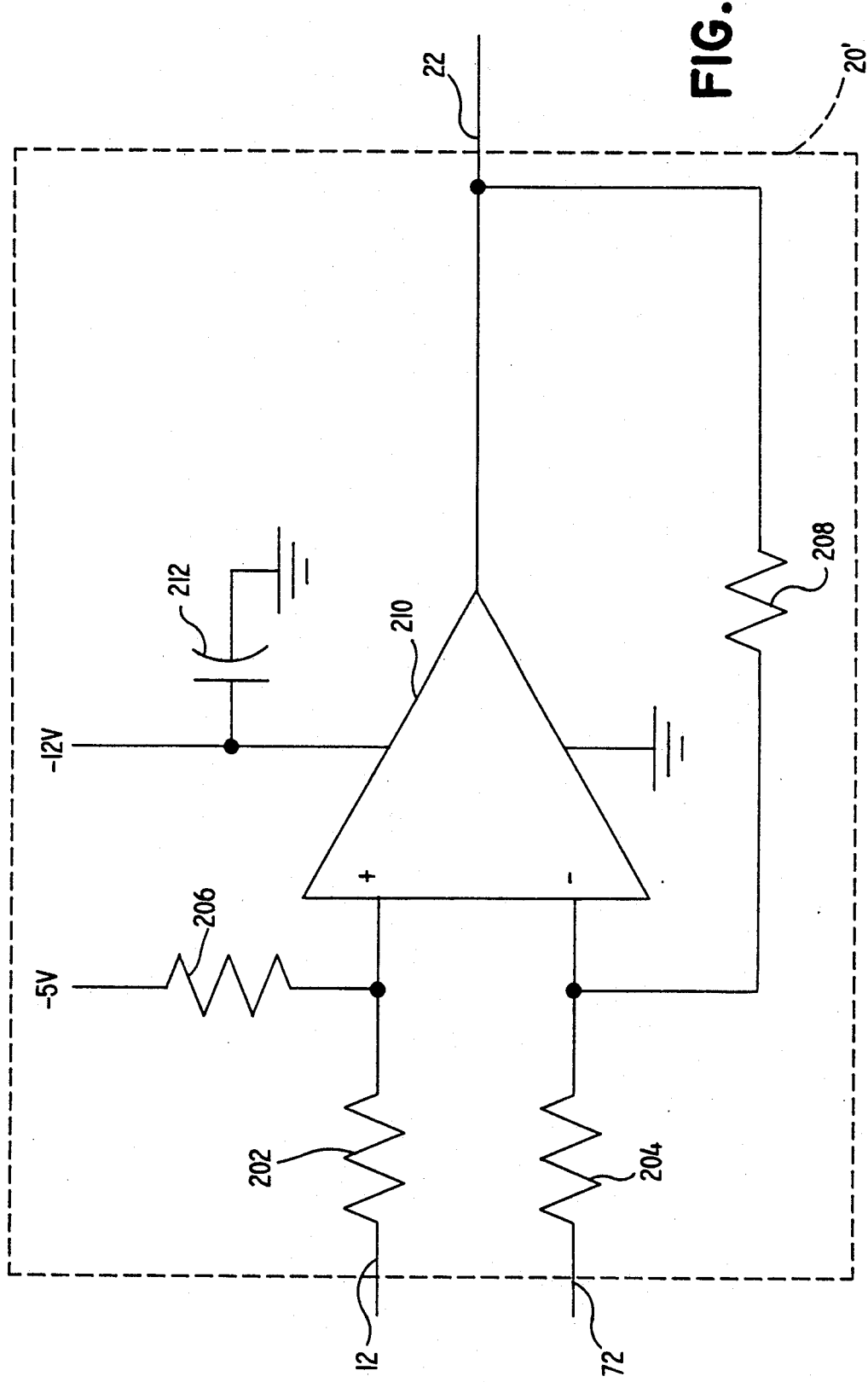
FIG. 3 illustrates an preferred implementation of voltage detection circuit 20 of FIG. 1.

FIG. 3 illustrates at 20' a preferred implementation of voltage detection circuit 20 of FIG. 1. In this implementation a difference signal is generated by subtracting the operating AC voltage across load 70 from the AC line voltage. The difference signal is therefore representative of the operating AC voltage and of the AC line voltage.

In particular, the AC line voltage is received at AC line voltage connector line 12 and transmitted through resistor 202 to the non-inverting input of operational amplifier 210. Similarly, the operating AC voltage is received at applied AC voltage connector line 72 and is transmitted through resistor 204 to the inverting input of operational amplifier 210. Resistor 206 is connected to −5 V and resistor 208 is connected to the output of operational amplifier 210. Operational amplifier 210 is configured as a differential amplifier. Hence resistor 202 and resistor 204 are chosen to be of identical resistance, and resistor 206 and resistor 208 are also chosen to be of identical resistance.

Figure 4:
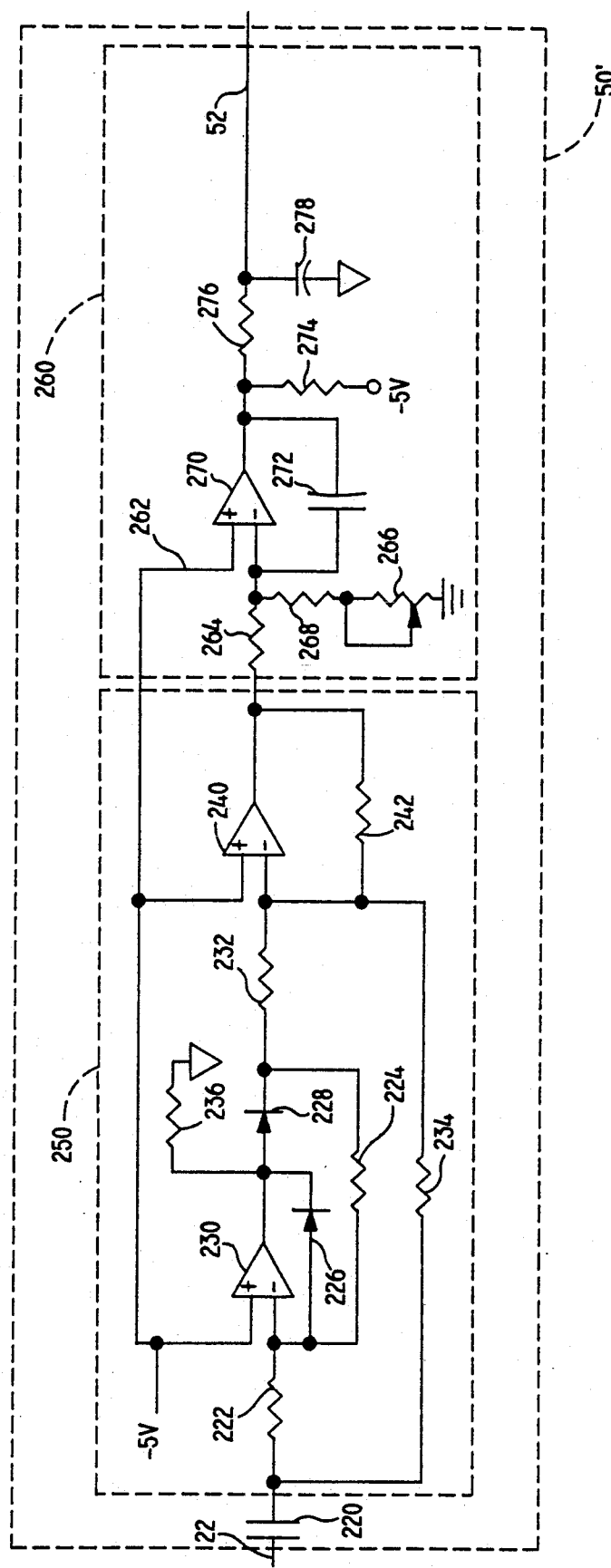
FIG. 4 illustrates a preferred implementation of averaging circuit 50 of FIG. 1 utilizing Full Wave Capacitor Coupled Feedback.

FIG. 4 illustrates at 50' a preferred embodiment of an averaging circuit 50 of FIG. 1. The measured signal is transmitted via measured signal connector 22 to averaging circuit 50. As stated above, averaging circuit 50 provides a time average of the measured signal. The measured signal is an instantaneous AC voltage signal, and the average signal is a voltage representative of the time average of the measured signal over a period corresponding to the period of the AC signal. Hence the average signal varies more slowly than the measured signal, changing only as the load or the rms value of the AC voltage changes. This embodiment utilizes a technique which will be referred to herein as Full Wave Capacitor Coupled Feedback, as the measured signal is capacitively coupled to a full-wave rectifier, as will be described below.

A phase shift capacitor 220 is disposed between the output of operational amplifier 210 of FIG. 3 and voltage signal rectifier 250 of averaging circuit 50 of FIG. 1. This capacitor modulates the output signal of operational amplifier 210 to provide a more homogenous rms-like AC value entering the voltage signal rectifier 250.

Voltage signal rectifier 250 performs full wave rectification of the measured signal as follows. Voltage signal rectifier 250 includes an inverting operational amplifier 230, which is set to have a unitary gain by utilizing a resistor 224 and a resistor 222 of equal resistance. For the negative portion of the AC signal transmitted from phase shift capacitor 220, the signal is applied at the inverting terminal of inverting operational amplifier 230. The output of inverting operational amplifier is therefore an inverted version of the phase-shifted AC signal from operational amplifier 210. Feedback is provided by resistor 224. This inverted signal passes through diode 228 and resistor 232 and enters the inverting input of operational amplifier 240. For the positive portion of the AC signal transmitted from phase shift capacitor 220, diode 228 blocks transmission of the output signal from inverting operational amplifier 230, and the positive portion is transmitted directly through resistor 234. Therefore, the signal applied to the inverting terminal of operational amplifier 240 is a rectified version of the signal input from phase shift capacitor 220. Operational amplifier 240 amplifies this rectified signal to a gain set by the ratio of the values of resistor 242 to resister 232. The amplified rectified signal is then transmitted to integrator 260.

The average signal is generated as follows. Voltage signal rectifier 250 is connected to the inverting input terminal of integrating operational amplifier 270. Resistor 268 and variable resistor (potentiometer) 266 are disposed between the inverting input terminal of operational amplifier 270 and ground to function as a voltage divider to scale the input to the desired input range of operational amplifier 270. Together these resistors function as a variable set-point resistor. The noninverting input terminal of integrating operational amplifier 270 is connected to the −5 V reference voltage. The feedback network for integrating operational amplifier 440 also comprises a capacitor 272 disposed between inverting input terminal and the output terminal of integrating operational amplifier 270. The specific values of the capacitor 272 and resistors 264, 266 and 268 are chosen to provide the correct amplification of the measured signal and a time constant appropriate to the anticipated loop dynamics of the load. This time constant determines the responsiveness of the voltage controller circuit to changes in the load, and is therefore chosen to allow rapid response to AC line voltage changes while providing a smooth average of the AC of the measured signal. The set point of the system may therefore be modified at manufacturing by varying the value of variable resistor 266.

Several additional elements are included in averaging circuit 50 to improve its performance and to match the input requirements of phase control chip 110 of FIG. 2. Resistor 274 ensures that the resulting average signal from output terminal of operational amplifier 270 falls within the desired voltage range. Resistor 276 and capacitor 278 act to filter the average signal prior to placement on average signal connector 52.

Figure 5:
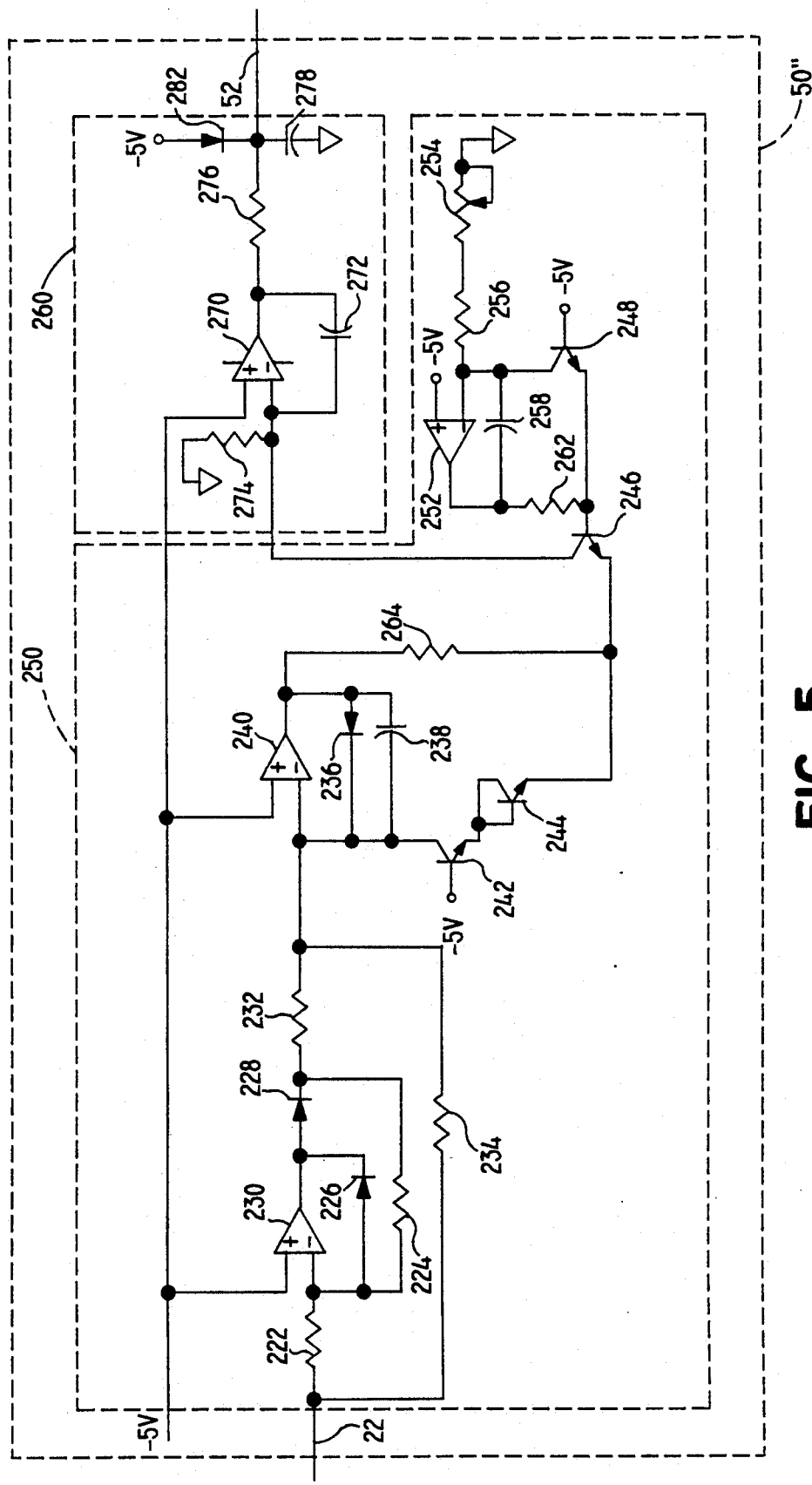
FIG. 5 illustrates an alternate implementation of averaging circuit 50 of FIG. 1 utilizing Mean Square Feedback.

FIG. 5 illustrates at 50'' an alternate implementation of averaging circuit 50 of FIG. 1 utilizing Mean Square Feedback, as will be discussed below. Elements common to the implementation of FIG. 4 and FIG. 5 share a common identifying numeral.

The first rectification stage of voltage signal rectifier 250 of this implementation, involving inverting operational amplifier 230, functions identically to the corresponding stage of FIG. 4. The second stage of voltage signal rectifier 250 is significantly different in the two implementations. In the embodiment illustrated in FIG. 5, operational amplifier 240 is configured as an logarithmic amplifier, while operational amplifier 270 is configured as an antilogarithmic integrating amplifier. The effects of these operations upon the integrated output of integrator 260 will cancel.

The operation of this stage of voltage signal rectifier 250 as well as of integrator 260 is determined by the combination of their feedback systems and the biasing circuit for the transistor 246. Logarithmic amplifier 240 has transistors 242 and 244 disposed between its inverting input and its output, while antilogarithmic operational amplifier 270 has an inverting input controlled by transistor 246. Transistor amplifier 270 is biased by the operation of logarithmic amplifier 252, which has a transistor 248 as part of its feedback network. Since the input current into an operational amplifier is ideally zero, the current flowing through this circuit flows primarily through the transistors. If the transistors are matched, the $V_{be}$ of transistor 246 is equal to the sum of the $V_{be}$ of transistor 242 and transistor 246 minus the $V_{be}$ of transistor 248. Now the $V_{be}$'s of the transistors are logarithmically proportional to their collector currents, and therefore the $i_c$ of transistor 246 is equal to the product of the $i_c$'s for transistors 242 and 244 divided by the $i_c$ for transistor 248. But the $i_c$'s for transistors 242 and 244 are equal, and are proportional to the input current to transistor 242. As a result these transistors produce a current through transistor 246 which is proportional to the square of the input current.

This signal is next input to integrator 260, which primarily comprises integrating antilogarithmic operational amplifier 270. Capacitor 272 is the feedback network for integrating antilogarithmic operational amplifier 270, and controls the integration.

It should be noted that the signal input to integrating antilogarithmic amplifier 270 is inversely proportional to the $i_c$ of transistor 248. This current is dependent upon the values of resistor 256 and potentiometer 254. Potentiometer 254 is provided to allow the user to vary the scaling of the signal input to integrating antilogarithmic amplifier 270 and thereby the average signal on average signal connector 52.

As with FIG. 4 above, several additional elements are included in the averaging circuit of FIG. 5 to improve its performance and to match the input requirements of phase control chip 110 of FIG. 2. Diode 236 is disposed between the inverting input and the output of logarithmic amplifier 240 as transistors 242 and 244 act as diodes in the opposite direction, and thereby provides a pathway for both half cycles of the AC cycle. Resistor 274 ensures that the resulting average signal from output terminal of operational amplifier 270 falls within the desired voltage range. Resistor 276 and capacitor 278 act to filter the average signal prior to placement on average signal connector 52. Diode 282 acts to clamp the output voltage so as to limit it to a range of voltages with −5 V as its minimum. In addition, capacitors 238 and 258 are disposed between the inverting input and output of operational amplifiers 240 and 252, respectively, to prevent the operational amplifiers from oscillating. Resistor 262 assists capacitor 258 in its operation.

Figure 6:
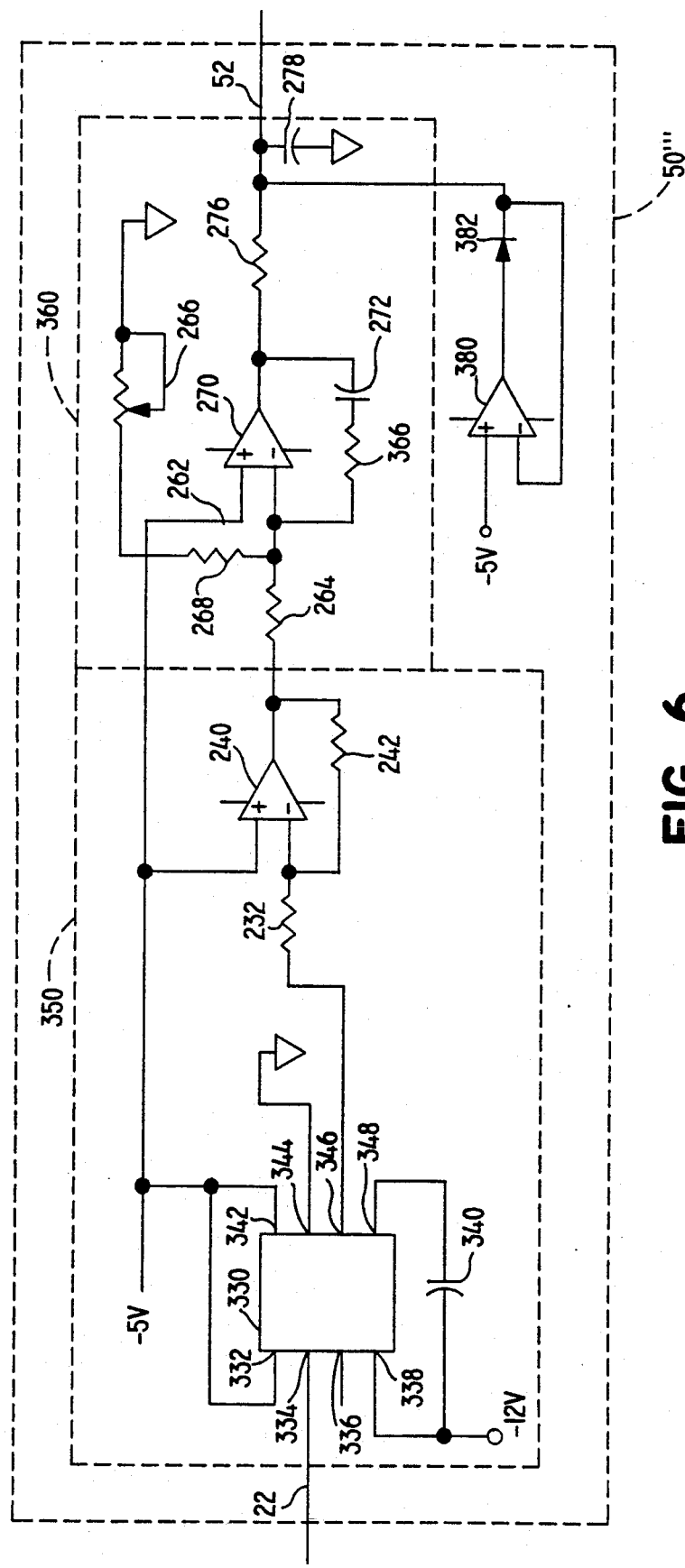
FIG. 6 illustrates another alternative implementation of averaging circuit 50 of FIG. 1 utilizing Root Mean Square Feedback.

FIG. 6 illustrates at 50''' another alternative implementation of averaging circuit 50 of FIG. 1 utilizing Root Mean Square Feedback. This embodiment uses a dedicated Root Mean Squared converter integrated circuit device. For example, the AD736JN RMS-to-DC Converter chip from Analog Devices performs this function and is illustrated as rms converter 330 in FIG. 6.

The rms converter chip 330 has eight connection pins. The $+V_s$ pin 344 is connected to ground, while the $-V_s$ pin 338 is connected to −12 V. $C_c$ pin 332 and COM pin 243 are each connected to −5 V. $C_{AV}$ pin 248 is connected to averaging capacitor 340, which is connected to −15 V. Averaging capacitor 340 is necessary for the operation of the AD736JN chip 330. The input to rms converter chip is received from measured signal connector 22. The rms output is transmitted from rms output pin 346 through resistor 232 to inverting operational amplifier 240. The gain from inverting operational amplifier 240 is determined by the ratio of the resistances of resistor 242 and resistor 232. The inverted and amplified signal is then input into integrator 360, which is identical in function to integrator 260 of FIG. 4, with the exception that resistor 274 is replaced by operational amplifier 380 and diode 382, which combine to form a perfect diode. The perfect diode clamps the signal to average signal connector 52 at a minimum of −5 V, and is preferred in driving the high impedance output of integrating operational amplifier 270 of FIG. 6.

The operation of the voltage controller circuit according to the present invention may be understood in light of the preceding description. In the event that the AC line voltage were to increase suddenly, the voltage detected by voltage detection circuit 20 would increase, resulting in an increased measured signal on measured signal connector 22 and thus an increased average signal from averaging circuit 50. This average signal is the input to the phase control chip 110 through program input pin 122. The signal on program input pin 122 controls the output of phase control chip 110, triac gate output pin 134. Hence rapid increases in AC line voltage result in later firing of triac gate output pin 134 and hence of pilot triac 112. Pilot triac 112 controls main triac 114, which determines the voltage applied across load 70. As the triacs fire later, the percentage of the AC line voltage applied across load 70 decreases. Hence the increase in AC line voltage will not result in a significant change in voltage applied across load 70. Similarly, a sudden drop in AC line voltage would result in an earlier firing of the triacs and thus a greater proportion of the AC line voltage would be applied to load 70. Thus the voltage controller circuit stabilizes at an equilibrium applied AC voltage to load 70. In one embodiment, the various resistances, capacitors and reference signal voltages are chosen to ensure that the system will stabilize at an applied voltage to load 70 of approximately 107 V.

There is a difference in the performance of the three averaging circuits shown in FIGS. 4, 5 and 6. In the embodiments shown in FIG. 5 and FIG. 6, the operating AC signal will remain set at the set point voltage level determined by the potentiometers as long as it is lower than the AC line voltage, without regard to minor fluctuations in AC line voltage or in load conditions. The embodiment of FIG. 4 varies with line and load changes. Hence the embodiment of FIGS. 5 and 6 provide an absolute constant AC level applied to load 70, whereas that of FIG. 4 provides a constant proportion AC level to load 70. Hence the appropriate voltage regulation to a particular application may be determined by the appropriate choice of an averaging circuit.

While specific preferred embodiments of the elements of the present invention have been illustrated above, various modifications of the invention in addition to those shown and described herein will become apparent to those skilled in the art from the foregoing description and accompanying drawings. Such modifications are intended to fall within the scope of the appended claims. For example, other available phase control chips may be used instead of the Plessey chip described herein. For example, the Plessey TDA 2086 chip may be used. Likewise, a "custom" integrated circuit chip may be described comprising most of the overall circuitry disclosed herein. Accordingly, the present invention is to be limited solely by the scope of the following claims.

What is claimed is:

1. A method for controlling the voltage applied to an inductive load, comprising the steps of:
   receiving an AC line voltage;
   generating an operating AC voltage from the AC line voltage;
   applying said operating AC voltage across the inductive load;
   generating an electronic measured signal which is a function of the magnitude of said operating AC voltage;
   generating an average signal representative of the average value of said electronic measured signal;
   modifying said operating AC voltage in response to said average signal by reducing the magnitude of said operating AC voltage below the line voltage for a portion of each AC voltage half-cycle, each portion beginning when the current through the inductive load is substantially zero, the length of said portion being determined by said average signal.

2. The method of claim 1 wherein the step of generating said average signal comprises inputting said measured signal into a rectifier circuit and rectifying said measured signal, and further comprising inputting the output of said rectifier circuit into an integrator circuit, thereby integrating said measured signal to generate said average signal.

3. The method of claim 1 wherein said step of reducing said load voltage comprises inputting said average signal into a phase control integrated circuit device, said phase control integrated circuit device generating a control signal operative to interrupt transmission of the line voltage to the load for said portion of each half cycle.

4. An apparatus for controlling the voltage applied to inductive load comprising:
   means for receiving an AC line voltage;
   means for generating an operating AC voltage from the AC line voltage by reducing the AC line voltage to be applied to the inductive load for a portion of each half-cycle thereof, each reduced-voltage portion beginning when the current through the load is substantially zero;
   means for applying said operating AC voltage across the load;
   voltage detection means for generating an electronic measured signal which is a function of the magnitude of said operating AC voltage;
   signal averaging means for generating an average signal representative of the average value of said electronic measured signal;
   AC voltage modulation means for modifying said generation of said operating AC voltage by changing the length of each voltage-reduction portion in response to said average signal.

5. A method for controlling the voltage applied to inductive load, comprising the steps of:
   receiving an AC line voltage;
   generating an operating AC voltage from the AC line voltage by switching off the AC line voltage to be applied to the inductive load for a portion of each half-cycle thereof such that the R.M.S. value of the operating AC voltage is below the R.M.S. value of the line voltage, each switched-off portion beginning when the current through the load is substantially zero;
   applying the operating AC voltage across the load;
   generating an electronic measured signal which is a function of the instantaneous magnitude of said operating AC voltage applied to the load;
   electronically integrating said measured signal to generate an average signal;
   modifying the operating AC voltage by changing the length of each switched-off portion in response to said average signal.

6. An apparatus for controlling the voltage applied to an electric motor comprising:
   means for receiving an AC line voltage;
   means for generating an operating AC voltage from the AC line voltage by reducing the AC line voltage applied to the motor for a portion of each half-cycle thereof, each reduced-voltage portion beginning when the current through the motor is substantially zero;
   means for applying said operating AC voltage across the motor;
   voltage detection means for generating a measured signal as a function of the magnitude of the instantaneous value of said operating AC voltage;
   signal averaging means for generating an average signal representative of the average value of said electronic measured signal;
   modulation means for modifying said generation of said operating AC voltage by changing the length of each voltage-reduction portion in response to said average signal; and
   a coupling circuit for coupling said measured signal to said signal averaging means and for modifying said measured signal such that the RMS value of the operating AC voltage increases with increasing motor loading.

7. An apparatus for controlling the voltage applied to an inductive load comprising:
   terminal means for receiving an AC line voltage;
   means for generating an operating AC voltage from the AC line voltage;
   connector means for applying said operating AC voltage across the inductive load;

voltage detection means for generating an electronic measured signal which is a function of the magnitude of said operating AC voltage;

signal averaging means for generating an average signal representative of the average value of said electronic measured signal;

AC voltage modulation means for adjusting the operating AC voltage in response to changes in said average signal by reducing the magnitude of said operating AC voltage below the line voltage for a portion of each AC voltage half-cycle, each portion beginning when the current through the inductive load is substantially zero, the length of said portion being determined by said average signal.

8. The apparatus of claim 7 wherein said voltage reduction means comprises a phase control integrated circuit device, said phase control integrated circuit device being responsive to said average signal to generate a control signal operative to switch off transmission of the line voltage to the load for said portion of each half cycle.

9. The apparatus of claim 8 wherein said signal averaging means comprises a rectifying circuit connected to said voltage detection means and an integrator circuit connected to said rectifying circuit and to said AC voltage modulation means.

10. An apparatus for controlling the voltage applied to an electric motor comprising:
means for receiving an AC line voltage;
means for generating an operating AC voltage from the AC line voltage by reducing the AC line voltage applied to the electric motor for a portion of each half-cycle thereof, each reduced-voltage portion beginning when the current through the motor is substantially zero;
means for applying said operating AC voltage across the motor;
voltage detection means for generating an electronically measured signal as a function of the magnitude of the operating AC voltage;
signal averaging means for generating an average signal representative of the average value of said electronically measured signal; and
modulation means for modifying said generation of said operating AC voltage by changing the length of each reduced-voltage portion in response to said average signal; and
wherein said voltage detection means comprises circuitry, including a capacitor means, responsive to changes in the loading of the motor for modifying said measured signal to increase the RMS value of the operating AC voltage with increasing motor loading.

11. An apparatus for controlling the voltage applied to an inductive load comprising:
means for receiving an AC line voltage;
means for generating an operating AC voltage from the AC line voltage by reducing the AC line voltage applied to the load for a portion of each half-cycle thereof, each reduced-voltage portion beginning when the current through the load is substantially zero;
means for applying said operating AC voltage across the load;
voltage detection means for generating an electronically measured signal as a function of the magnitude of the operating AC voltage;
signal averaging means for generating an average signal representative of the average value of said electronically measured signal, said average signal being related to the RMS value of said operating AC voltage; and
modulation means for modifying said generation of said operating AC voltage by changing the length of each reduced-voltage portion in response to said average signal; and
wherein said voltage detection means comprises electronic means for modifying said measured signal such that said average signal is more closely related to the RMS value of said operating AC voltage than the unmodified average signal.

12. The apparatus of claim 11 wherein said electronic means comprises a capacitor coupled between said voltage detection means and said averaging means.

13. The apparatus of claim 11 wherein said electronic means further comprises a full-wave rectifier coupled between said voltage detection means and said signal averaging means.

14. The apparatus of claim 11 wherein said load comprises an electric motor and wherein said electronic means of said voltage detection circuit is responsive to changes in the motor's loading and is further for increasing the RMS voltage to the motor with increasing motor loading.

15. An apparatus for controlling the voltage applied to an inductive load comprising:
means for receiving an AC line voltage;
means for generating an operating AC voltage from the AC line voltage by reducing the AC line voltage applied to the load for a portion of each half-cycle thereof, each reduced-voltage portion beginning when the current through the load is substantially zero;
means for applying said operating AC voltage across the load;
voltage detection means for generating a measured signal as a function of the magnitude of the instantaneous value of said operating AC voltage;
signal averaging means for generating an average signal representative of the average value of said electronic measured signal and having a correspondence to the RMS value of said operating AC voltage;
a coupling circuit for coupling said measured signal to said signal averaging means and for modifying said measured signal to improve the correspondence of said average signal to the RMS value of said operating AC voltage; and
modulation means for modifying said generation of said operating AC voltage by changing the length of each voltage-reduction portion in response to said average signal.

16. The apparatus of claim 15 wherein said coupling circuit comprises a capacitor.

17. The apparatus of claim 15 wherein said load comprises an electric motor and wherein said coupling circuit is responsive to changes in the motor's loading and is further for increasing the RMS voltage to the motor with increasing motor loading.

* * * * *

UNITED STATES PATENT AND TRADEMARK OFFICE
CERTIFICATE OF CORRECTION

PATENT NO. : 5,329,223
DATED : July 12, 1994
INVENTOR(S) : Chris A. Riggio

It is certified that error appears in the above-indentified patent and that said Letters Patent is hereby corrected as shown below:

Column 1, line 60, delete "that" and insert therefor --than--.
Column 2, line 8, delete the second occurrence of "a" and insert therefor --an--.
Column 2, line 67, delete "an" and insert therefor --a--.
Column 3, line 33, delete "an" and insert therefor --a--.
Column 4, line 35, before "AC" insert --the--.
Column 5, line 12, after "equal" insert --,--.
Column 5, line 19, delete the second occurrence of "to" and insert therefor --the--.
Column 6, line 21, after "Amplifier" insert --230--.
Column 6, line 36, delete "resister" and insert therefor --resistor--.
Column 6, line 50, after "between" insert --the--.
Column 6, line 60, after "AC" insert --voltage--.

UNITED STATES PATENT AND TRADEMARK OFFICE
CERTIFICATE OF CORRECTION

PATENT NO. : 5,329,223
DATED : July 12, 1994
INVENTOR(S) : Chris A. Riggio

It is certified that error appears in the above-indentified patent and that said Letters Patent is hereby corrected as shown below:

Column 6, line 68, after "from" insert --the--.
Column 7, line 15, delete "an" and insert therefor --a--.
Column 7, line 34, delete "246" and insert therefor --244--.
Column 8, line 18, before "$C_c$" insert --The--.
Column 8, line 19, before "COM" insert --the--.
Column 8, line 19, before "$C_{AV}$" insert --The--.
Column 8, line 20, after "to" insert --a terminal of an--.
Column 8, line 20, delete the second occurrence of "is" and insert therefor --has a second terminal--.
Column 8, line 21, delete "to -15 V" and insert therefor --to -12 V--.
Column 8, line 23, after "chip" insert --330--.
Column 8, line 24, after "from" insert --the--.
Column 8, line 48, before "triac" insert --which is the--.
Column 8, line 50, after "in" insert --the--.
Column 8, line 61, before "applied" insert --of--.

Signed and Sealed this

Nineteenth Day of December, 1995

*Attest:*

BRUCE LEHMAN

*Attesting Officer*   Commissioner of Patents and Trademarks